May 9, 1933.   C. H. LEIS   1,908,262
MULTIPLE CUTTER MILLING MACHINE
Filed Dec. 5, 1929   4 Sheets-Sheet 1

INVENTOR
Carl H. Leis
by his attorneys
Byrnes, Stebbins, Parmelee & Blenko

May 9, 1933.  C. H. LEIS  1,908,262
MULTIPLE CUTTER MILLING MACHINE
Filed Dec. 5, 1929   4 Sheets-Sheet 2

INVENTOR
Carl H. Leis
by his attorneys
Byrnes, Stebbins, Parmelee & Blenko

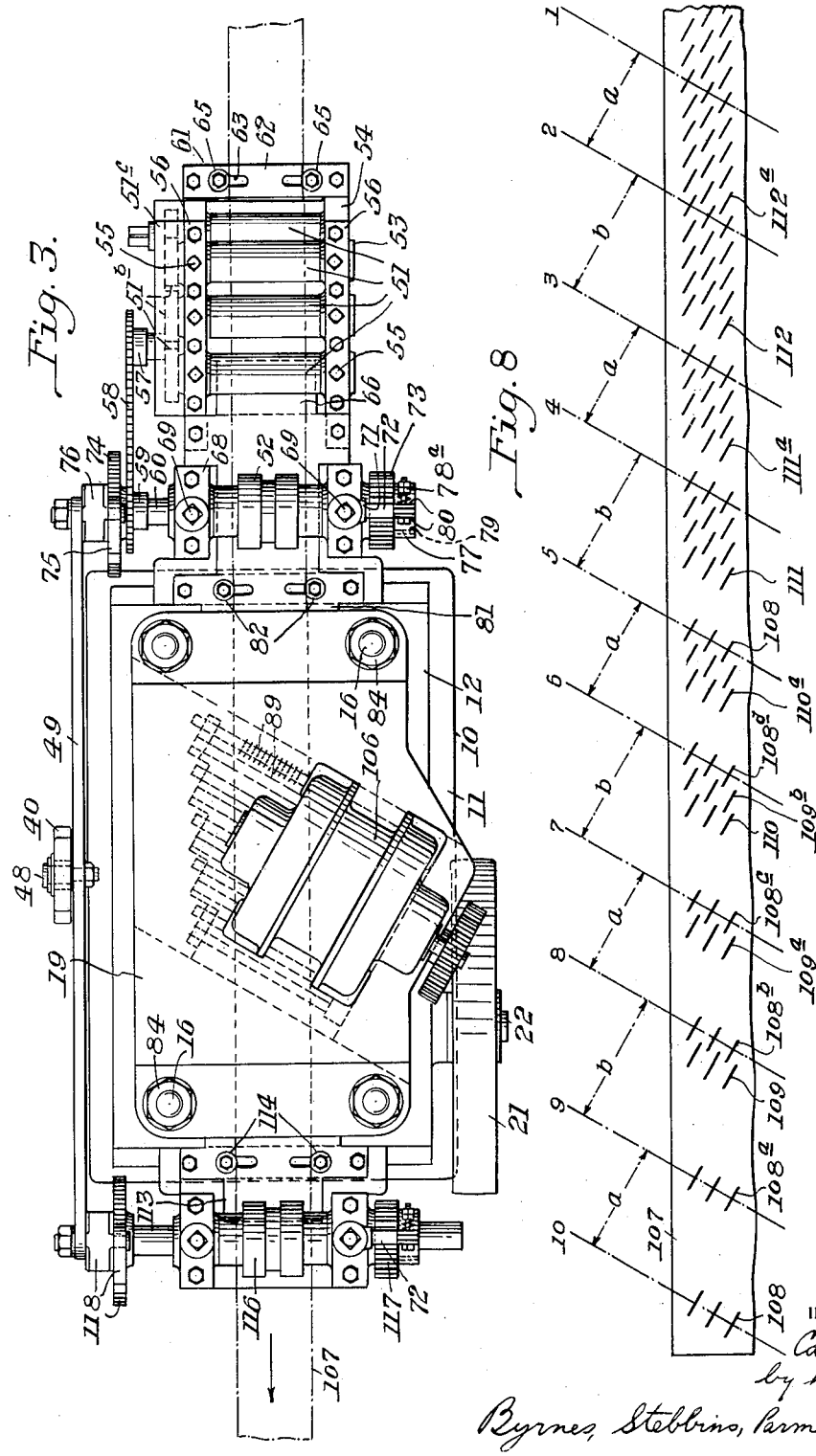

May 9, 1933.  C. H. LEIS  1,908,262
MULTIPLE CUTTER MILLING MACHINE
Filed Dec. 5, 1929  4 Sheets-Sheet 4
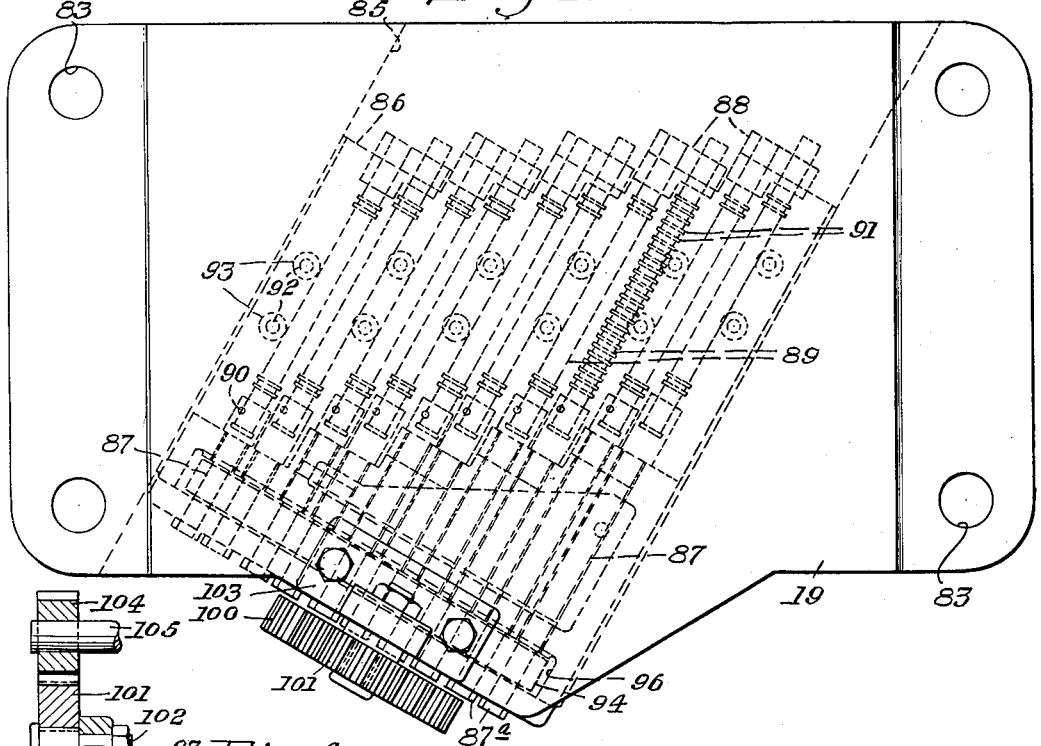
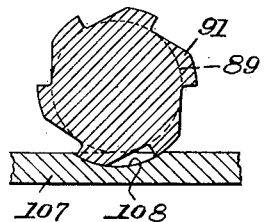
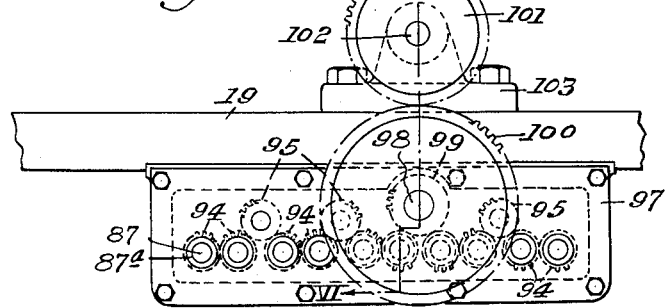
INVENTOR
Carl H. Leis
by his attorneys
Byrnes, Stebbins,
Parmelee & Blenko Patented May 9, 1933

1,908,262

UNITED STATES PATENT OFFICE

CARL H. LEIS, OF NEW CASTLE, PENNSYLVANIA, ASSIGNOR TO JOHNSON BRONZE COMPANY, OF NEW CASTLE, PENNSYLVANIA, A CORPORATION OF PENNSYLVANIA

MULTIPLE CUTTER MILLING MACHINE

Application filed December 5, 1929. Serial No. 411,771.

My invention relates to milling machines, and is particularly directed to a multiple spindle milling machine adapted for the manufacture of slotted strip to be used in the fabrication of lubricated bushings.

Lubricated bushings having internal axial slots filled with lubricating material are well known and have been found very useful in certain installations. An objection to this type of bushing has become apparent in that the edges of the axial slots tend to wear grooves in a shaft or bearing rotating in a bushing of this type.

I provide a lubricated bushing having internal slots adapted to be filled with a lubricant such as graphite, and I position the slots at an angle to the axis of the bushing. This arrangement of the graphite-filled slots reduces the tendency of the edges of the slot to groove a shaft or bearing rotating in the bushing. In order to simplify the manufacture of a bushing of the novel type mentioned, I have devised a multiple spindle milling machine adapted for continuously forming angularly disposed slots in a strip of bushing material such as bronze.

The milling machine of my invention embodies a supporting frame, a vertically reciprocable cutter head slidable in the frame, a table or platen for supporting the strip to be slotted, and intermittent feeding means for advancing the strip through the machine. Cutters are positioned in the head with their axes in a horizontal plane and at an angle to the path of travel of the strip. The cutters are disposed in the cutter head in a plurality of groups, the space between groups being greater than the space between the cutters in each group whereby, when the strip is advanced by the intermittent feeding means, the cutters of each group engage the strip at a point adjacent the slot formed by the preceding group of cutters. A common driving means is provided for reciprocating the cutter head and for the intermittent feeding means.

A clearer understanding of my invention may be obtained by the consideration of the following description of a present preferred embodiment thereof which is illustrated in the accompanying drawings, in which Figure 1 is a side elevation of the complete multiple spindle milling machine;

Figure 3 is a top plan view of the device as seen by looking down on Fig. 1;

Figure 4 is a top plan view of the cutter head to an enlarged scale;

Figure 5 is an end view of the cutter head looking along the axes of the cutter spindles;

Figure 6 is a transverse sectional view of the cutter head along the plane of the line VI—VI of Fig. 5;

Figure 7 is a schematic illustration of the rotary cutters and the material worked on thereby;

Figure 8 is a plan view of a portion of the entering end of the strip after it has passed through the machine; and Figure 9 is a perspective view of a bushing having internal angularly disposed slots for the reception of lubricating material.

Figure 1:
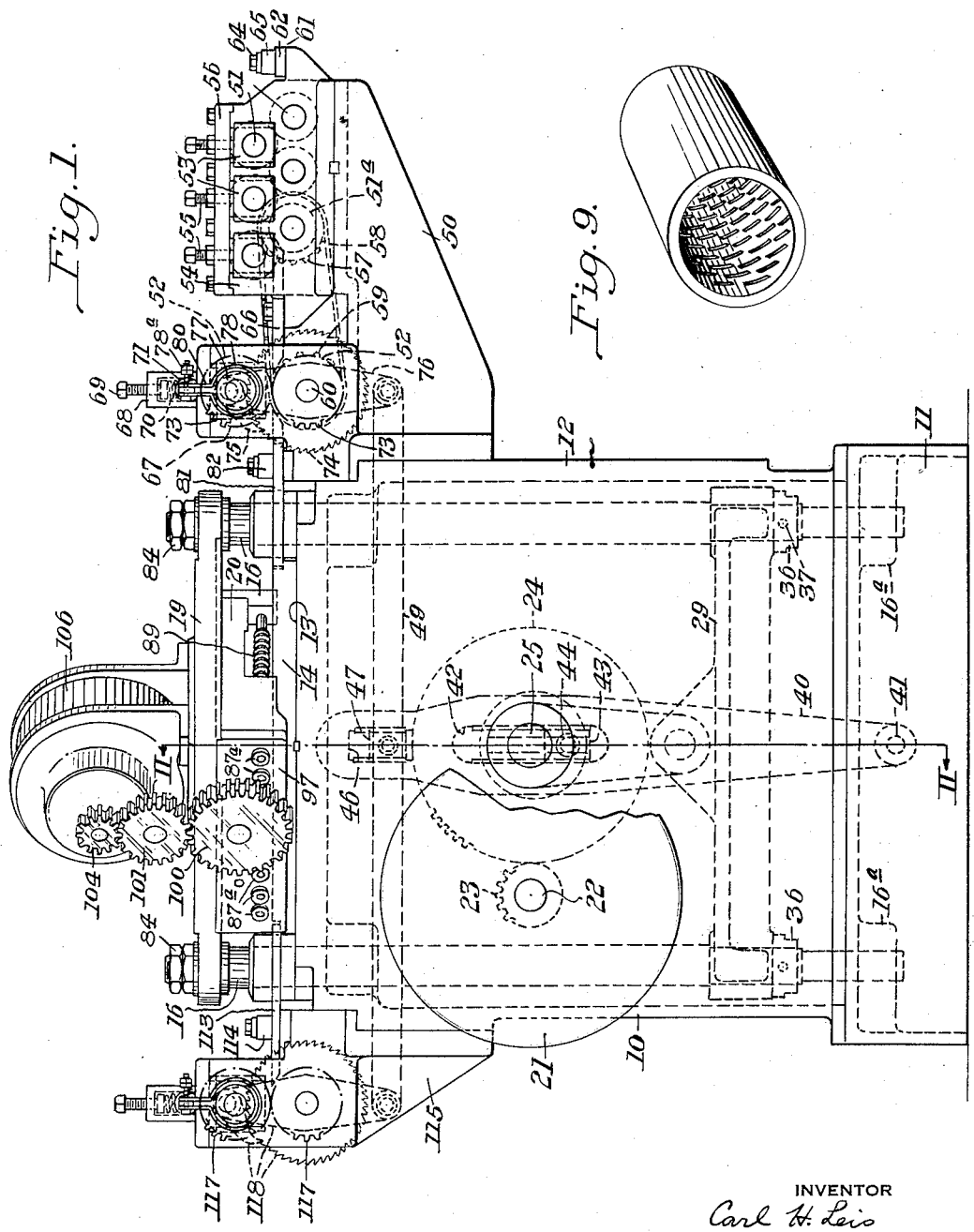
Figure 2:
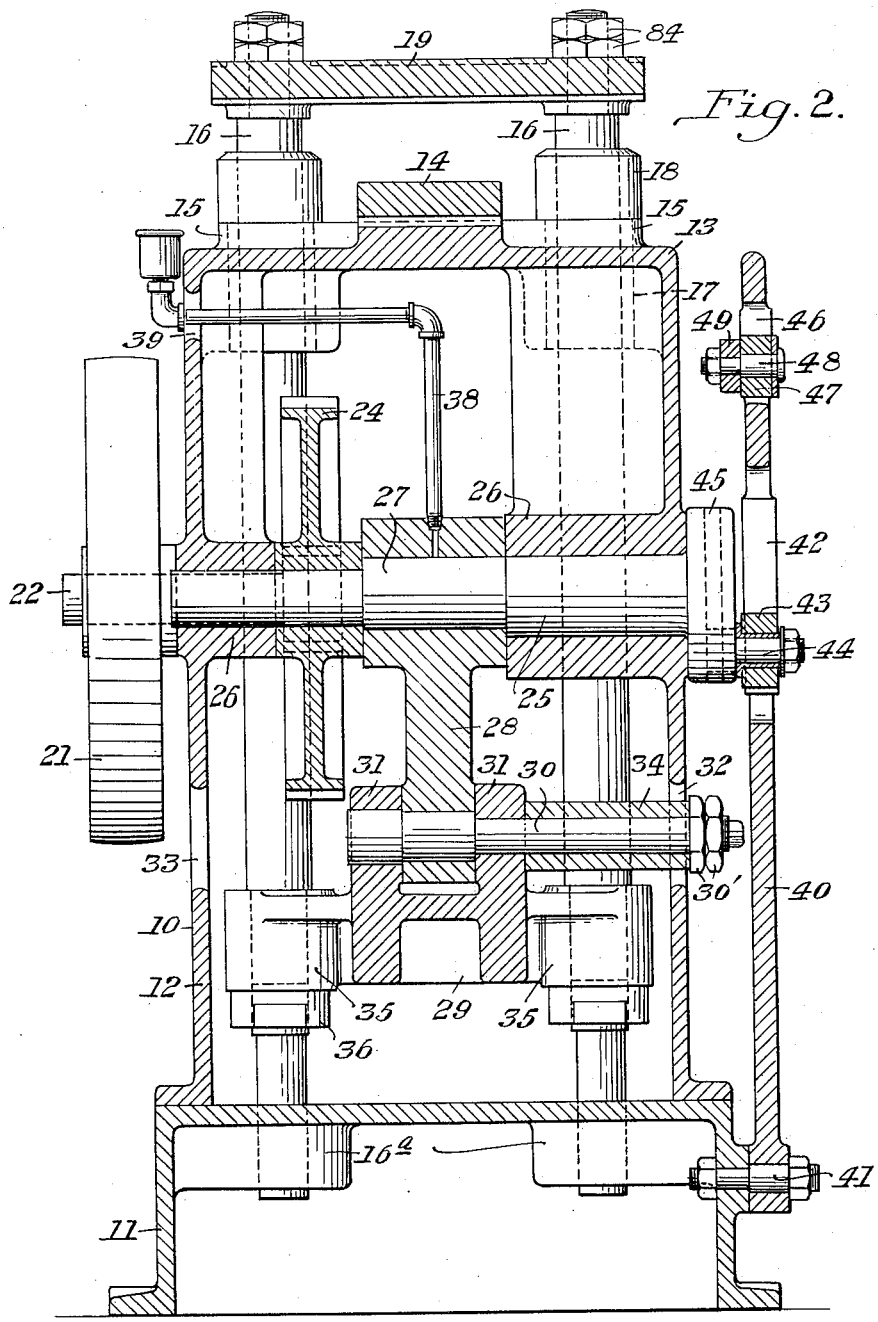
Figure 2 is a transverse section on the plane of the line II—II of Fig. 1, the cutter head, driving motor and feeding means being omitted for the sake of clearance.

Referring in detail to the drawings, and with special reference to Figs. 1 through 3, the multiple spindle milling machine 10 includes a base casting 11 and a machine housing 12 secured thereto. The machine housing top 13 carries a work table or platen 14, and is provided with bearings 15 in which connecting rods 16 are supported for vertical reciprocation. The lower ends of the rods 16 slide in bearings 16a in the base casting 11. Each of the bearings 15 has a bushing 17 positioned therein. The bushings 17 have enlarged portions 18 at the upper end which are seated on the bearings 15.

A spindle bracket holder 19 is secured to the upper ends of the connecting rods 16 and is adapted to reciprocate therewith. The spindle bracket holder 19 carries a cutter head 20 on its lower surface. The details of the cutter head will be described hereinafter, with special reference to Figs. 4 through 6.

A driving pulley 21 is keyed to a shaft 22 journaled in the machine housing 12. The shaft 22 carries a pinion 23, which meshes with a gear 24 on a second shaft 25 journaled in bearings 26 integral with the housing 12. The shaft 25 has an eccentric portion 27 with which a pitman 28 cooperates. The pitman 28 is secured to a cross-head 29 by means of a pin 30 passing therethrough and through aligned holes in a pair of lugs 31 formed on the cross-head. The pin 30 has an extension which passes through a hole 32 in the machine housing to facilitate a removal of the pin through an aligned opening 33 on the other side of the housing. The pin 30 is secured in position by means of clamping nuts 30' and a spacing sleeve 34. The cross-head includes projecting arms 35 which are bored to receive the lower ends of the connecting rods 16, the lower ends of the rods being reduced to form a shoulder for engaging the upper surface of the bored projections. The lower surfaces of the projections 35 are engaged by the nuts 36 which are pinned to the connecting rods by pins 37. A conduit 38 is screwed into the upper sleeve of the pitman 28 and extends out of the machine housing through an opening 39 to permit easy lubrication of the eccentric 27 on the shaft 25.

The shaft 25 is thus effective for reciprocating the spindle bracket holder 19 and the connecting rods 16 by means of the eccentric 27, the pitman 28, and the cross-head 29. The shaft 25 also serves to operate the feeding means which intermittently advances the bronze strip across the work table 14. The means for operating the strip-feed includes an oscillatable feed lever 40, which is pivoted to the base casting 11 at 41. The feed lever 40 has a central longitudinal slot 42 in which a slide block 43 is adapted to reciprocate. The slide block 43 is engaged by a crank pin 44 which is adjustably mounted in a crank disc 45 integral with the shaft 25. A second longitudinal slot 46 is formed in the feed lever 40 and a slide block 47 cooperates therewith. The slide block 47 is fitted with a pin 48 to which a connecting bar 49 is secured. The function of the connecting bar 49 is to operate the feeding mechanism for the strip to be slotted by the milling cutters. The feed mechanism will now be described in detail with reference to Figs. 1 and 3.

The strip-feeding mechanism includes feeding and straightening rolls. Feed rolls are positioned at both ends of the milling machine and the straightening rolls are placed ahead of the feed rolls on the entrance end of the machine. The following description of the feed rolls refers specifically to those at the entrance end, but is equally applicable to the feed rolls at the other end of the machine. A bracket 50 is bolted to the entrance end of the machine and is provided with bearings for the straightening rolls 51 and the feed rolls 52, adjacent thereto. The bearings for the straightening rolls 51 consist of bearing blocks 53, slidably mounted in side members 54 which are bolted to the bracket 50. Adjusting screws 55 are threaded through tapped holes in cover plates 56, bolted to the straightener roll side members 54. The upper and lower feed rolls 51 are geared as shown in Figure 3, the gearing shown at 51b being enclosed within a gear cover 51c and the lower feed roll 51a has a sprocket 57 mounted thereon, which is adapted to be driven by a chain 58 from a cooperating sprocket 59 on a shaft 60, which carries the lower feed roll 52.

The straightener roll side members 54 support a gate 61 for the bronze strip, which guides the strip through the rolls. The gate consists of a front guide roll strap 62, bolted to the straightener roll side members 54. The strap 62 has longitudinal slots 63, in which the guide roller screws 64 are adjustably mounted. The screws 64 serve as bearings for guide rollers 65, between which the strip is guided into the rolls. By means of the slots 63, the guide rolls may be adjusted for various widths of strip.

The strip to be slotted by the milling cutters is fed to the machine from a roll supported in any convenient manner and passes over the strap 62 of the gate 61 and between the rollers 65. The strip then passes through the upper and lower straightener rolls 51 and onto a rear guide plate 66, which receives the strip from the straightener rolls and directs it between the entering feed rolls 52. The guide plate 66 is bolted to the bracket 50. The bracket 50 is provided with bearings for the feed rolls 52. The bearings for the lower feed roll 52 are integral with the bracket 50. The bearings for the upper feed roll 52, however, are constituted by a slidable bearing block 67. A feed roll bearing cap 68 is bolted to the bracket 50 above the bearing block 67 and is provided with an adjusting screw 69. A spring 70 between the end of the screw 69 and the bearing block 67 urges the upper feed roll 52 into engagement with the lower feed roll. One of the feed roll bearing caps 68 has an integral boss 71 thereon which is tapped to receive a brake stud 72, the purpose of which will be explained later.

The upper and lower feed rolls 52 are connected by means of gears 73 so that they are simultaneously driven at the same speed. The driving means for the feed rolls 52 includes a ratchet wheel 74 fixed to the shaft 60. The ratchet wheel 74 is adapted to be intermittently driven by means of a pawl 75, which is pivoted at the upper end of a ratchet lever 76. The lever 76 is loosely journaled on the shaft 60 and its lower end has a pivotal engagement with the reciprocating connecting bar 49. As the drive pulley 21 is rotated to operate the crank disc 45, through the shaft 25, the resulting oscillation of the feed lever 40 is communicated through the connecting bar 49 to the ratchet wheel 76 and to the feed rolls 52.

In order to prevent over-travel of the feed rolls 52, I provide a reduced hub 77 on the driving gear 73 on the upper feed roll shaft. A brake band 78, having a lining 79, surrounds the hub 77 and exerts a braking action thereon. The brake band 78 has upwardly extending fingers 80 which engage the flattened end portion of the brake stud 72. The pressure on the brake band may be adjusted by means of the adusting screw and spring 78a.

From the feed rolls, the strip passes over an intermediate guide roller plate 81, which is bolted to bracket 50 and is provided with adjustable guide rollers 82 corresponding to those shown at 65. The strip is thus guided onto the work table or platen 14 where it is adapted to be engaged by the cutters on cutter head 20. From the foregoing detailed description of the machine, it will be apparent that a common driving means is provided for reciprocating the cutter head 20 and for intermittently advancing the strip. A detailed description of the cutter head will now be given with special reference to Figs. 4 through 7.

The spindle bracket holder 19 is provided with holes 83 which receive the upper reduced ends of the connecting rods 16, the holder 19 resting on the shoulders of the connecting rods and being secured thereto by means of locking nuts 84. The spindle bracket holder 19 has an angularly disposed transverse slot or channel 85 formed in the lower surface thereof. Within this slot is received a spindle bracket 86 which is bolted to the bracket holder 19. A plurality of spindle heads 87 of varying lengths are journaled in one end of the spindle bracket 86 and set collars 87a are pinned to the free end of the heads 87. A plurality of spindle end bearings 88 are bolted to one end of the bracket 86 and each bearing receives the ends of two rotary cutters 89. The cutters are arranged in groups of two, and one bearing 88 is provided for each group. The other ends of the cutters are received in the sockets of the spindle heads and are pinned thereto by pins 90. Each cutter 89 is provided with a series of cutting discs 91, which are illustrated in detail in Fig. 7.

Pressure pins 92 are received in holes 93 in the spindle bracket 86 and engage the surface of the work table 14, indicated in Fig. 6 by the dotted line, as the bracket holder 19 descends. When the bronze strip is passed through the machine, the pressure pins 92 engage the top surface of the strip and hold it firmly against the work table 14, while it is being slotted by the cutters.

The spindle heads 87 are provided with suitable driving gears 94. The gears on the spindle heads of the cutters of each group are in mesh with each other and auxiliary driving gears 95 connect the driving gears of the adjacent groups of cutters. The result of this arrangement of the gearing is that some of the the cutters rotate in one direction, while others rotate in the other direction. Any sideward thrust exerted by the cutters on the strip is thus neutralized. The driving gears 94 are positioned in a gear chamber 96 at one side of the spindle bracket which is covered by a gear chamber cover 97. A stub shaft 98 is journaled in the gear chamber cover 97 and the spindle bracket 86 and a driving pinion 99 is keyed thereto. A reduction gear 100 is keyed to the outer end of the shaft 98 and is in mesh with another reducing gear 101. The reducing gear 101 is journaled on a stub shaft 102, which is mounted in a bracket 103 bolted to the spindle bracket holder 19. The rotary cutter gear train is driven by a pinion 104 on the shaft 105 of a motor 106 secured to the spindle bracket holder 19 to which suitable electrical connections (not shown) are made.

In Fig. 7 one of the cutters 91 on the spindle 89 is shown in engagement with the bronze strip 107 and the slot cut therein by the cutter is shown at 108.

In Fig. 8 I have shown a portion of the leading end of the strip after it has passed through the machine, the slots formed therein being indicated by the short angularly disposed lines. The axes of the ten cutter spindles are indicated by the reference numerals 1 to 10 and the reference characters a and b represent the distance between cutters and between adjacent groups of cutters respectively. The distance between adjacent groups of cutters is greater than the distance between cutters. This arrangement of cutters in groups makes it possible to form a continuous series of slots in the strip without the necessity of spacing the cutters as closely together as the slots are positioned. When the cutter head 20 first descends on the bronze strip 107, the slots 108, 108a, etc., are formed by the ten cutters. The cutters are then raised and the strip advanced the distance between adjacent cutters. The cutters are again lowered and form the slots 109, 109a, etc. This cycle of operations is repeated to form the slots 110, 110a, etc., 111, 111a, etc., 112, 112a etc. A series of closely spaced slots is thus formed in the strip by groups of cutters which are spaced at a greater distance than that between adjacent slots. The showing of Fig. 8 is based on the assumption that the strip is placed beneath the cutters before the operation of the machine is started. If the strip is fed in automatically and the cutters simultaneously reciprocated the series of slots will be continuous from the entering end of the strip.

Referring again to Figures 1 and 3, the slotted strip after it has been worked on by the cutters, passes over a rear guide plate 113, which is fitted with guide rollers 114, similar to those shown at 65 and 82. The rear guide plate 113 is bolted to a feed roll bracket 115. The bracket 115 is bolted to the machine housing 12 and is similar to the inner end of the bracket 50, having substantially duplicate feed roll mechanism. This mechanism includes the feed rolls 116 geared together by means of gears 117. The ratchet and pawl driving mechanism 118 is a duplicate of that shown at the entering end of the machine and is actuated by the connecting bar 49, simultaneously with the movement of the ratchet and pawl 74 and 75. Similar adjusting means for controlling the pressure on the feed rolls and for exerting a braking action thereon are provided.

When the strip has passed through the feed rolls 116, it may be subjected to any known process for filling the slots with lubricating material of which graphite is an example. After the slots have been filled, the strip is sheared into lengths depending upon the length of the bushing to be formed therefrom. The lengths are then rolled into cylinders. It will be obvious that, as the lengths are rolled into cylinders, the sides of the slots will be forced together slightly by the bending action and will form recesses of slightly dovetail cross section. This tends to retain the graphite in the slots.

In Fig. 9, I have illustrated an example of the bushing which I form from the strip having angularly disposed slots on one face thereof. It will be apparent from an examination of Fig. 9 that the edges of the slots are at an angle to the axis of the bushing so that there will be less tendency for grooves to be formed in the shafts or bearings rotating in the bushing than would be the case with bushings of the known type, in which the slots are axially disposed so that the edges thereof form effective cutting surfaces in engagement with the members rotating in the bushing.

It will be obvious from the foregoing description that the milling cutter of my invention is effective for rapidly producing slotted strip for the manufacture of bushings. The entire operation is automatic and no attention is required, once the machine is adjusted, except when a new strip is to be threaded through the machine.

Although I have illustrated and described only one embodiment of my invention, it will be obvious that numerous changes therein will occur to those skilled in the art. It is not my intention, therefore, to be limited to the details of the embodiment herein described, since any changes within the spirit of the invention are included within the scope of the appended claims.

I claim:

1. In a multi-spindle milling machine for working continuous material, a table, a cutter head mounted on rods slidable in said table, a shaft journaled in said table, an eccentric on said shaft, a cross head secured to said rods and a pitman connecting said eccentric and said crosshead for reciprocating said head, an oscillating lever pivoted to the table, a crank on said shaft engaging a slot in said lever for oscillating the latter, a ratchet and pawl intermittently actuated by said lever for feeding material, a plurality of rotary cutters mounted on said head with their axes in a horizontal plane and at an angle to the path of travel of said strip, and a motor on said head for driving said cutters.

2. A multi-spindle milling machine for slotting strip metal comprising a table, a vertically reciprocable cutter head mounted on rods slidable in said table, a shaft journaled in the table and an oscillatable lever pivoted thereto, an eccentric on the shaft for reciprocating the table and a crank thereon for engaging said lever, a ratchet and pawl actuated by said lever for feeding the strip, a plurality of cutter shafts mounted horizontally in said head and at an angle to the path of travel of the strip across the table, and a motor on said head for driving the cutter shafts.

3. In a milling machine, a table, feed rolls for advancing material across the table, a vertically reciprocable cutter head, means for vertically reciprocating said head, means for intermittently actuating said rolls, cutters in said head, and a motor on said head for driving the cutters.

4. A multi-spindle milling machine for slotting metallic strip comprising a table, a vertically reciprocable cutter head mounted on guides slidable on said table, and an oscillatable lever pivoted thereto, means for reciprocating the head and oscillating the lever, means including feed rolls actuated by the lever for intermittently feeding strip across the table, cutters journaled in said head, a motor on the head, and driving connections between said motor and a plurality of said cutters.

5. In a milling machine for slotting strip material, a table, a cutter head reciprocable on guides in the table, having a plurality of spindle each carrying a plurality of cutters, feed rolls for passing strip across said table, means for reciprocating the head to bring said cutters into intermittent engagement therewith, and a common drive for the feed rolls and the reciprocating means.

6. In a milling machine, a horizontal work table, means for advancing strip material across the table step by step, a cutter head above the table, guides in the table supporting the head for vertical reciprocation, a plurality of cutter spindles journaled in said head, each of said spindles having a plurality of milling cutters for engaging said material on reciprocation of said head, and common driving means for said spindles.

In testimony whereof I have hereunto set my hand.

CARL H. LEIS.